US006716268B2

(12) United States Patent
Molyneux et al.

(10) Patent No.: US 6,716,268 B2
(45) Date of Patent: Apr. 6, 2004

(54) SLUGGING CONTROL

(75) Inventors: Peter David Molyneux, Coalville (GB); John Paul Kinvig, Loughborough (GB)

(73) Assignee: Lattice Intellectual Property Ltd., London (GB)

( * ) Notice: Subject to any disclaimer, the term of this patent is extended or adjusted under 35 U.S.C. 154(b) by 52 days.

(21) Appl. No.: 10/169,738

(22) PCT Filed: Jan. 12, 2001

(86) PCT No.: PCT/GB01/00108

§ 371 (c)(1), (2), (4) Date: Jul. 17, 2002

(87) PCT Pub. No.: WO01/53649

PCT Pub. Date: Jul. 26, 2001

(65) Prior Publication Data

US 2003/0010204 A1 Jan. 16, 2003

(30) Foreign Application Priority Data

Jan. 17, 2000 (GB) ............................................ 0000945
Jun. 2, 2000 (GB) ............................................ 0013331

(51) Int. Cl.$^{7}$ ............................................ B01D 35/157
(52) U.S. Cl. ................................ 95/22; 95/24; 95/241; 96/174; 137/2
(58) Field of Search ................................ 95/19, 22, 24, 95/241; 261/64.3; 96/156, 174, 195; 137/2, 12, 557

(56) References Cited

U.S. PATENT DOCUMENTS 5,390,547 A * 2/1995 Liu ......................... 73/861.04
5,478,504 A 12/1995 de Almeida Barbuto
6,390,114 B1 * 5/2002 Haandrikman et al. ........ 137/2

FOREIGN PATENT DOCUMENTS

| | | | |
|---|---|---|---|
| EP | 0 331 295 | | 9/1989 |
| EP | 0 410 522 | | 1/1991 |
| WO | 87 01759 | | 3/1987 |
| WO | 96 00604 | | 1/1996 |
| WO | WO 03033870 | A1 * | 4/2003 |

* cited by examiner

*Primary Examiner*—Robert Hopkins

(57) ABSTRACT

A method of controlling occurrence of slugging in a riser of a pipeline arrangement including a riser base and pipeline conveying a multiphase fluid system in which the gas phase may be natural gas. The upper end of riser is connected to a separator vessel. The gas phase of the multiphase fluid system is separated from the liquid phase so that the separated gas leaves through gas outlet pipe controlled by a first valve, and the liquid leaves through an outlet pipe controlled by a first valve. The first valve regulates the velocity of gas along the pipeline towards the riser. A pressure sensor observes the gas pressure in the riser base, and if the observed pressure exceeds a predetermined control pressure value a three term pressure indication control causes the first valve to be operated to pen to an extent that increases the gas outflow through the pipe, and thus increases the velocity of gas in the pipeline to avoid occurrence of severe slugging in the riser. The observation of the predetermined control pressure value is deemed to signify incipient slugging.

14 Claims, 3 Drawing Sheets

SLUGGING CONTROL

Figure 1:
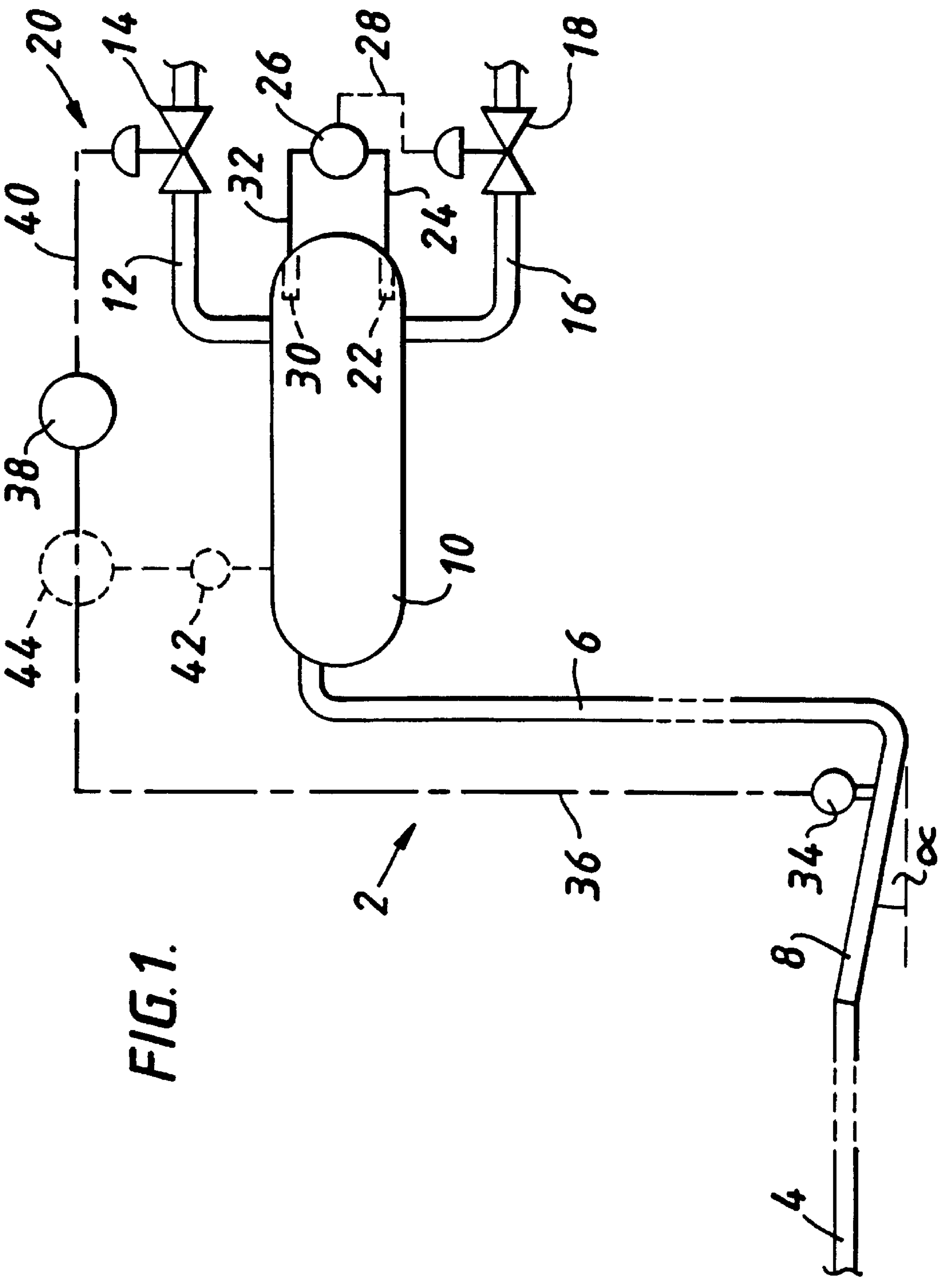

This invention relates to a method of controlling occurrence of severe slugging in a riser of a pipeline conveying a multiphase fluid system, and also relates to a combination comprising a pipeline with a riser for conveying a multiphase fluid system wherein the combination is adapted to control occurrence of severe slugging in the riser.

When natural gas is taken from where it occurs in nature in a naturally occurring gas reservoir in the earth's crust by means of a well supplying a pipeline from a well-head, the supplied gas is often naturally accompanied by liquid, for example water and/or hydrocarbon liquid. Such hydrocarbon liquid may be or may comprise oil. Thus the pipeline conveys a multiphase fluid system to a production facility which may comprise separator means to separate the gas from the liquid, gas drying means, filtering means, cooling means, and dewpointing means etc. Frequently a substantially vertical riser connects the pipeline with the production facility; this is particularly the case where the well is under water, for example under the sea or a lake where the pipeline can be on a bed of the sea or lake from which bed the riser ascends, often through a considerable distance, to the production facility, which is usually above the surface of the water on a production platform. That platform may be unmanned and may be in a remote and/or hostile location. If the gas flow is above a certain rate the multiphase system ascends through the riser in a churn flow of a mixture of the gas and liquid. But when the gas flow is slow the liquid phase can form one or more slugs of liquid at a base of the riser and eventually the liquid slugs increase in size or combine to an extent which blocks off the riser thus stopping the flow of gas to the production facility. This is the commencement of severe slugging. Gas pressure upstream of the blocking slug increases pushing even more of the forming liquid slug into the riser so that the head of the slug in the riser ascends towards the upper end of the riser. The column of liquid slug creates a hydrostatic pressure which increases as the column lengthens, and this pressure is substantially equal to the increasing gas pressure in the pipeline. A stage is reached where the upper end of the liquid slug discharges into the production facility upon the riser becoming substantially full of the slug. Now the hydrostatic pressure is a maximum for the riser and liquid concerned, and the gas pressure downstream of the slug forces a bubble of gas into the lower end of the riser which immediately reduces the hydrostatic pressure exerted by the reduced length of slug up the riser. The excess of gas pressure over the hydrostatic pressure causes the slug to shoot up the riser at high speed followed by a sudden rush of gas which all threaten to overwhelm the production facility. This blowdown is detected by severe slugging detection means which operates to cause valve means to close to cut off the riser from the production facility and also close down operation of the latter. This means production of gas is stopped whilst the effects of the severe slugging are dealt with, and production may not be resumed for at least several hours thereby causing financial loss which can be exacerbated by the possibility of resumed production having to be at a low level and then progressively increased to a normal rate.

Severe slugging can be a cyclical phenomenon.

An object of the invention is to provide a method of controlling occurrence of severe slugging by intervention in operation of the pipeline to prevent occurrence of said severe slugging.

According to a first aspect of the invention there is provided a method of controlling severe slugging in a riser of a pipeline conveying a multiphase fluid system, the method comprising providing separation vessel means connected to an upper part of the riser to receive therefrom the multiphase fluid system for separation of a gas phase of the fluid system from a liquid phase, providing the separation vessel means with a gas outlet comprising valve means to regulate speed of gas flow along the pipeline towards said riser in at least a vicinity of a lower end of the riser, observing pressure in the pipeline at position adjacent to said riser, and varying an extent to which said valve means is open so as to vary gas velocity in the pipeline to a value opposing or preventing occurrence of severe slugging in the riser.

The observed pressure may be gas pressure.

The extent to which the valve means is opened may increase the velocity of the gas flow in the pipeline adjacent to the riser.

The extent to which the valve means is opened may be increased when the observed pressure rises above a pre-determined value. Said pre-determined value may be derived empirically.

The extent to which the valve means is opened may be a function of a three term control.

The valve means may be operated with a view to maintaining the observed pressure in the pipeline at a substantially pre-determined value.

According to a second aspect of the invention there is provided a pipeline to convey a multiphase fluid system, said pipeline comprising a riser, separator vessel means connected to an upper part of the riser to receive therefrom the multiphase fluid system to separate a gas phase of the system from a liquid phase, said separator vessel means being provided with a gas outlet comprising valve means to regulate flow of gas from the separator vessel means, pressure observing means to observe pressure in the pipeline adjacent to said riser and provide a signal corresponding to observed pressure, control means responsive to said signal to cause said valve means to operate to vary an extent to which the valve means is open, and the arrangement being such that when the pressure observing means observes a pressure greater than a pre-determined value said control means causes operation of the valve means to vary the extent to which the valve means is open so as to vary gas velocity in the pipeline to a value opposing or preventing occurrence of severe slugging in the riser.

Figure 2:
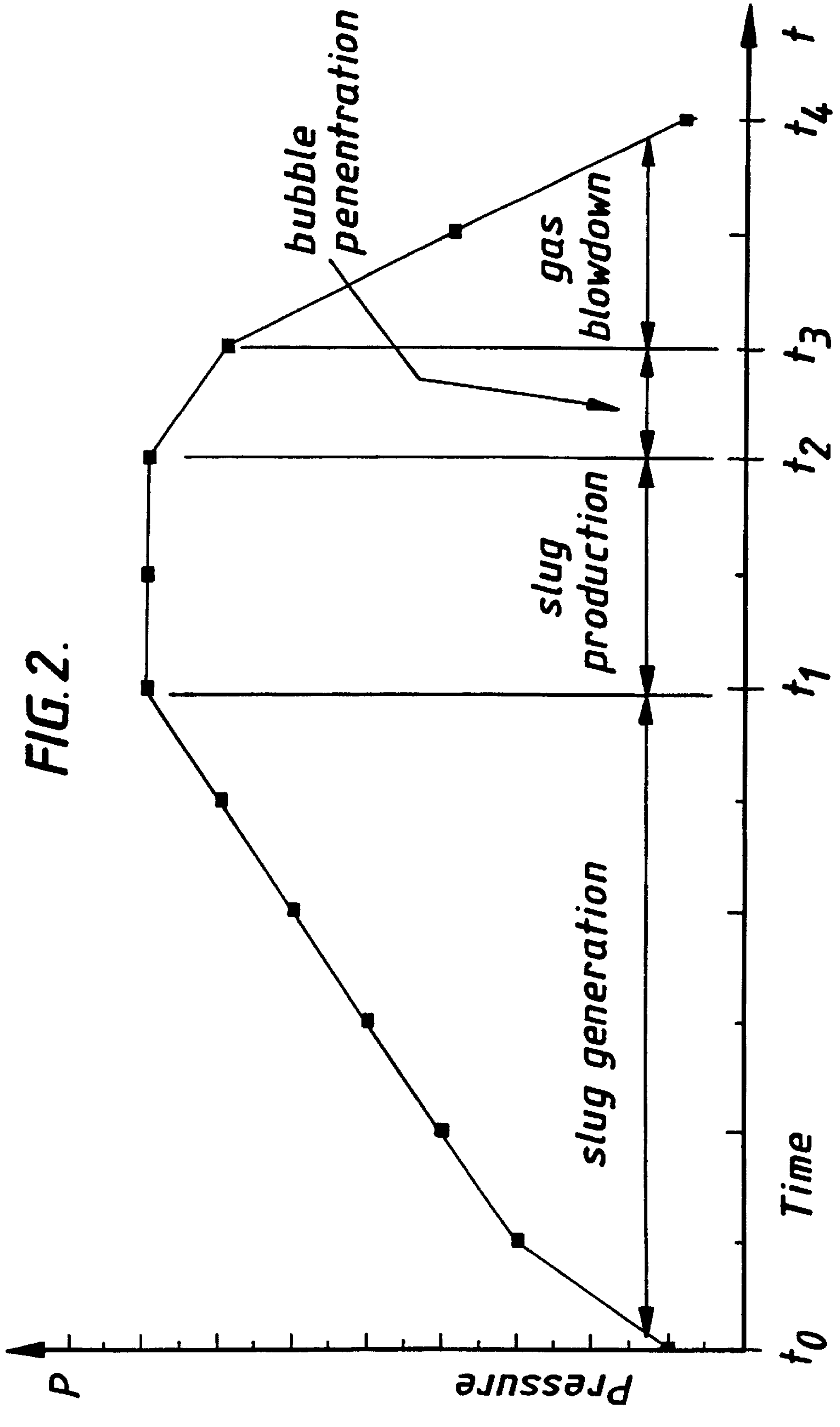
Figure 3:
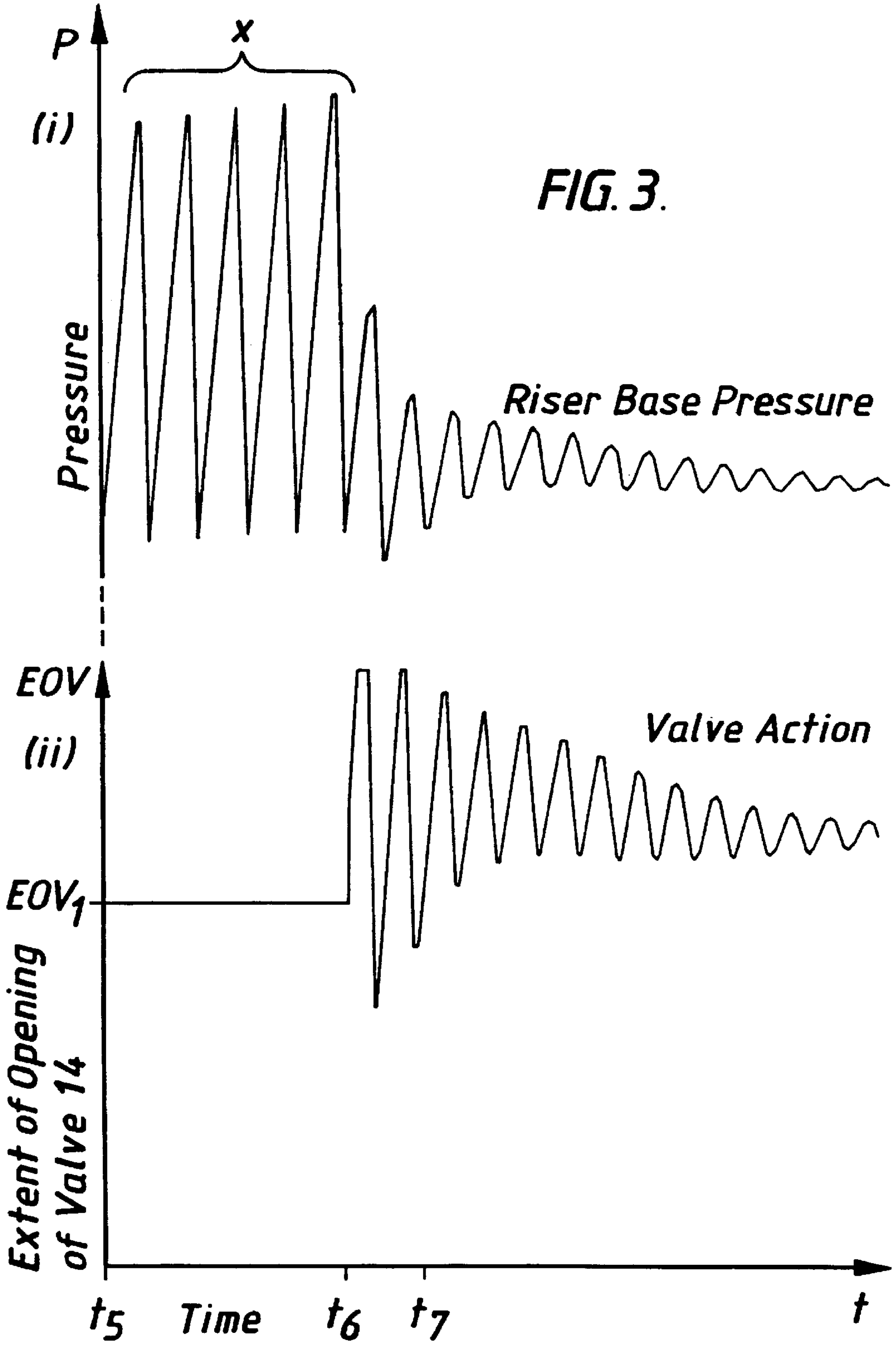

The invention will now be further described, by way of example, with reference to the accompanying drawings in which:

FIG. 1 is a diagrammatic representation of a pipeline formed according to the second aspect of the invention for carrying out the method according to the first aspect;

FIG. 2 shows an example of variation in gas pressure P with time t in a base of the riser in FIG. 1 during occurrence of severe slugging, and FIG. 3 shows curves, based on investigations conducted, which indicate variation that can be expected with respect to time t of (i) pressure P of gas in a base of the riser in FIG. 1 before the method according to the first aspect of the invention to put into effect and after it is put into effect, and of (ii) an extent EOV to which the valve means regulating the gas outlet in FIG. 1 is open before the method according to the first aspect of the invention is put into effect and after it is put into effect.

With reference to FIG. 1, a pipeline arrangement 2 comprises a pipeline 4 which is conveying a multiphase fluid system comprising a gas phase and a liquid phase from a multiphase system supply. For example the pipeline 4 may be conveying from a production gas well a natural gas phase and a liquid phase associated with the occurrence of natural gas. The pipeline 4 which may be on a sea-bed or a lake-bed is connected to a base of a vertically ascending riser 6. The riser base can comprise a section 8 of piping which may be inclined at an angle α to the horizontal. Angle α may be small, for example about 5°. At its upper end, for example above a surface of the water of a sea or lake, the riser 6 opens into a separator vessel 10 in the form of a tank from which leads a gas outlet pipe 12 including a regulating valve 14 and a liquid outlet pipe 16 including a regulating valve 18. The separator vessel 10 may be part of a gas production facility 20 (for example a natural gas production facility) on a gas production platform. In this facility the separator vessel 10 is used in known manner to separate a gas phase (of the multiphase fluid system) from the liquid phase, the separated gas leaving via outlet 12 for, for example, further processing whilst the separated liquid leaves via outlet 16 possibly also for, for example, further processing. A first liquid level sensor 22 in the separator vessel 10 is connected by signal line 24 to a liquid level control 26, which may be electronic, connected by signal line 28 to the valve 18. A second liquid level sensor 30, at a higher level in the separation vessel than the sensor 22, is connected by signal line 32 to the liquid level control 26. The valve 18, which may be operated by motor means, is closed automatically by occurrence of a signal on line 28 denoting when the liquid level in the separator falls to just below the level of the sensor 22. Once the valve 18 is closed it cannot be opened until the control 26 observes a signal on line 32 corresponding to the liquid level having risen to at least the level of the sensor 30, whereupon the valve 18 remains open until the liquid level next drops to just below sensor 22.

A pressure sensor or pressure transmitter 34 observes the pressure in the riser base 8 and provides on signal line 36 a signal corresponding to the observed pressure value. The signal on line 36 is input to a pressure indicator control 38, which may be an electronic control, wherein the pressure value represented by the signal is processed and an output signal produced on line 40 in response to which an extent to which the valve 14 is open is automatically controlled. For example the valve 14 may be operated by motor means responding to the output signal on line 40.

In FIG. 2 variation in pressure P in the riser base 8 with respect to time t is represented over a severe slugging cycle which might occur in the absence of use of the current invention. The cycle starts at time $t_0$ when the liquid phase flowing in the pipeline 4 plugs the base 8 of the riser and prevents further flow of gas into the riser 6. As liquid and gas continue to flow along pipeline 4 into the base 8 of the riser, the liquid slug increases in size and upstream of the slug the gas pressure rises until at time $t_1$ the gas pressure reaches substantially a maximum equal to the hydrostatic pressure of the liquid in the riser 6 which is now full of liquid slug. Thus continued supply of liquid into the lower end of the riser 6 causes liquid slug to discharge from the upper end of the riser between times $t_1$ and $t_2$. Eventually gas flowing along the pipeline pushes the liquid slug forward until a bubble of gas penetrates the vertical column of slug in the riser 6 as suggested, for example, between times $t_2$ and $t_3$. Because of the presence of the bubble$_1$ at time $t_2$ the head of hydrostatic pressure in the riser 6 starts to drop, and the difference between the decreasing hydrostatic pressure and the greater gas pressure upstream of the slug propels the remaining liquid slug from the riser 6 in a rapid blowdown between, for example, times $t_3$ and $t_4$.

Thus it will be understood that at commencement of severe slugging the pressure in the riser base 8 starts to increase. For a given pipeline arrangement 2, an empirical determination based on observation can be performed to determine a pre-determined pressure value (pre-determined pressure control value) which upon being attained in the riser base 8 may be taken as indicating severe slugging is about to commence or has just commenced.

Referring to FIG. 1, control 38 is arranged so that when the pressure sensor 34 is observing a pressure value which differs from the aforesaid pre-determined pressure control value the control 38 operates the valve 14 to vary the extent to which it is to open. In the case of where the observed pressure value exceeds the pre-determined pressure control value the extent to which valve 14 is open is increased to increase the flow rate of gas through the separation vessel 10 and thus increase the velocity of gas along the pipeline 4 to encourage a maintenance of churn flow of the multiphase fluid system through the base 8 and riser 6 and thus discourage occurrence of severe slugging.

It will be appreciated that the valve 14 has a pre-determined set-point extent of opening in respect to which the extent of opening is varied in response to operation of the pressure indicator control 38. In FIG. 3 variation in extent of opening of the valve 14 (EOV) is plotted against time t, the aforesaid pre-determined position $EOV_1$. If the valve 14 were maintained at the position $EOV_1$ in curve (ii) over a time period $t_5$ to $t_6$ severe slugging can occur cyclically as indicated at x in curve (i) if the gas velocity in the pipeline 4 is too low. Should the invention now be brought into operation at time $t_6$ so the pressure indicator control 38 actuates the valve 14, it can be seen in curve (ii) that the extent of opening of the valve is fairly quickly maintained above the set-point $EOV_1$ beyond time $t_7$, but varies as a function of the difference or error between the gas pressure value currently being observed by the sensor 34 and the said pre-determined pressure control value. In response to the action of valve 14, after time $t_6$ the pressure in the riser base 8 in curve (i) is rapidly controlled and comes at least to fluctuate over a relatively small pre-determined range between pressure values not much greater than the natural minimum pressure value to which the multiphase system in the pipeline 4 may drop at an end of a severe slugging cycle if it were to occur; more preferably, after time $t_6$, the pressure in the riser base 8 is rapidly controlled and attains or tends towards a substantially constant pre-determined pressure value.

pressure indicator controller 38 may be a three term controller comprising proportional, integral and derivative terms in the output signal. The proportional term may be a function of the difference or error between the pressure value currently being observed by the pressure sensor 34 and the pre-determined pressure control value.

If desired a pressure sensor or pressure transmitter 42 may be provided to observe gas pressure in the separator vessel 10 and provide a signal to an either/or control 44 to provide an output acting on the control 38 to operate the valve 14 so the gas pressure in the vessel 10 may remain substantially at a desired constant value. But in the event of pressure sensor 34 observing a pressure value in excess of the pre-determined pressure control value the either/or control 48 is ignored and the control 38 operates in response to the signal from the pressure sensor 34.

What is claimed is:

1. A method of controlling occurrence of slugging in a riser of a pipeline conveying a multiphase fluid system, comprising:

providing separator vessel means connected to an upper part of the riser to receive from the riser the multiphase fluid system for separation of a gas phase of the fluid system from a liquid phase;

providing the separator vessel means with a gas outlet comprising valve means to regulate a flow gas from the separator vessel means and thereby regulate velocity of gas flow along the pipeline towards the riser in at least a vicinity of a lower end of the riser;

observing pressure in the pipeline at a position adjacent to the riser; and varying an extent to which the valve means is open to vary gas velocity in the pipeline to a value opposing or preventing occurrence of slugging in the riser.

2. A method as claimed in claim 1, wherein increasing the extent to which the valve means is opened increases velocity of the gas flow in the pipeline adjacent to the riser.

3. A method as claimed in claim 1, wherein the extent to which the valve means is opened is increased in value when the observed pressure rises above a predetermined value.

4. A method as claimed in claim 1, wherein the extent to which the valve means is opened is decreased when the observed pressure falls below a pre-determined value.

5. A method as claimed in claim 4, wherein said predetermined value is derived empirically.

6. A method as claimed in claim 1, wherein the extent to which the valve means is opened is a function of an error between the observed pressure and a predetermined value.

7. A method as claimed in claim 1, wherein the extent to which the valve means is opened is a function of an output from a three term control.

8. A method as claimed in claim 1, wherein the valve means is operated to maintain the observed pressure in the pipeline substantially within a predetermined pressure range.

9. A method as claimed in claim 1, wherein the valve means is operated to maintain the observed pressure in the pipeline at a substantially constant predetermined value.

10. A method as claimed in claim 1, further comprising:

providing the separator vessel means with a liquid outlet comprising second valve means;

observing a level of the liquid in the separator vessel means; and closing the second valve means when the level of the liquid falls below a first predetermined level.

11. A method as claimed in claim 10, wherein the second valve means is opened when the level of the liquid in the separator vessel means rises above a second predetermined level higher than the first predetermined level.

12. A pipeline to convey a multiphase fluid system, comprising:

a riser;

separator vessel means connected to an upper part of the riser to receive from the riser the multiphase fluid system to separate a gas phase of the system from a liquid phase, the separator vessel means being provided with a gas outlet comprising valve means to regulate flow of gas from the separator vessel means;

pressure observing means to observe pressure in the pipeline adjacent to the riser and to provide a signal corresponding to observed pressure;

control means responsive to the signal to cause the valve means to operate to vary an extent to which the valve means is open;

wherein when the pressure observing means observes a pressure greater than a predetermined value the control means causes operation of the valve means to vary an extent to which the valve means is open to vary gas velocity in the pipeline to a value opposing or preventing occurrence of slugging in the riser.

13. A pipeline as claimed in claim 12, wherein the control means is arranged to cause the extent to which the valve means is opened to be increased when the observed pressure rises above the predetermined value.

14. A pipeline as claimed in claim 12, wherein the control means is arranged such that the extent to which the valve means is opened in response to the control means is a function of an error between the observed pressure and the predetermined value.

* * * * *